UNITED STATES PATENT OFFICE.

JAMES D. DARLING, OF PHILADELPHIA, PENNSYLVANIA, ASSIGNOR TO HARRISON BROS. & CO., INCORPORATED, OF PHILADELPHIA, PENNSYLVANIA, A CORPORATION OF PENNSYLVANIA.

METHOD OF MAKING ALKALINE CYANIDS.

SPECIFICATION forming part of Letters Patent No. 698,464, dated April 29, 1902.

Application filed October 5, 1901. Serial No. 77,659. (No specimens.)

*To all whom it may concern:*

Be it known that I, JAMES D. DARLING, a citizen of the United States, residing at No. 4826 Greenway avenue, in the city and county of Philadelphia and State of Pennsylvania, have invented a certain new and useful Improvement in the Manufacture of Alkaline Cyanids, (Case C,) of which the following is a specification.

There are many well-known processes by which the formation of alkaline cyanid is accomplished by the direct combination at proper temperatures of carbon, alkali, and nitrogen. In most of these processes the alkali is supplied in the form of a hydrate or carbonate. In this case it is necessary to supply more carbon than is theoretically required, and as a result the product is a black mass consisting of alkaline cyanid with a considerable excess of carbon, sometimes termed "cyanized" carbon. It is necessary in order to produce a marketable article to remove the carbon, which has usually been accomplished either by converting the cyanized carbon into ferrocyanid or by filtration processes, which are tedious and expensive. In certain other processes the alkali is supplied in metallic form. In this case it is possible to convert all of the carbon into alkaline cyanid; but the process is attended by the disadvantage of the comparatively high cost of the alkali metal. Furthermore, the nitrogen must then be supplied in the form of ammonia, which is much more expensive than the nitrogen by itself.

By my present invention I employ as the chief source of alkali the cheaper carbonate, hydroxid, or oxid, (preferably the latter,) and I get rid of the excess of carbon which would remain if nothing else were used by subjecting the cyanized carbon thus produced to the action of an alkaline amid, whereby an additional quantity of alkaline cyanid is formed by the combination of this excess of carbon with the alkaline amid.

In practicing my process I produce cyanized charcoal by any of the well-known processes for combining an alkaline carbonate, hydroxid, or oxid with carbon and nitrogen. In such processes the nitrogen may either be supplied in its pure state or as ammonia or from nitrogenous substances—as, for example, animal matter. To the cyanized charcoal thus produced I add a quantity of alkaline amid. The operation is carried on at a sufficiently high temperature, and the reaction of the alkaline amid upon the excess of carbon converts the entire mass into pure alkaline cyanid. The alkaline amid may be made by any of the well-known processes, such as passing ammonia-gas over or through molten alkali metal. In order that the result shall contain no carbon mixed with the alkaline cyanid, it is necessary that the proportions of the alkali metal to the carbon should approximate the theoretical. Thus if sodium cyanid is to be formed the pure product will contain twenty-three pounds of sodium to twelve pounds of carbon. Consequently if the first-mentioned step of the process produces one hundred and ten pounds of cyanized charcoal containing from ten to eleven per cent. of uncombined carbon—*i. e.*, about twelve pounds—I add thirty-nine pounds of alkaline amid. I have found that in this way by using the proper proportions of the cyanized charcoal and the alkaline amid it is possible to convert into cyanid all of the free carbon which otherwise would remain mixed with the cyanid, so that at the completion of the process there remains nothing but pure alkaline cyanid. The reaction which takes place I believe to be substantially represented by the following equation:

$$NaCN + C + NaNH_2 = 2NaCN + H_2.$$

It will be understood that when I use in the claim the phrase "alkaline oxid" I mean to include as its equivalents hydroxid or carbonate.

Having thus described my invention, I claim—

The process of producing pure alkaline cyanid, which consists in subjecting alkaline oxid to the action of carbon and nitrogen under the influence of heat, whereby cyanized charcoal is produced; and subjecting this cyanized charcoal to the action of alkaline amid under the influence of heat, whereby the carbon remaining in the cyanized charcoal is converted into cyanid, substantially as described.

JAMES D. DARLING.

Witnesses:
JAMES H. BELL,
C. BRADFORD FRALEY.